(12) United States Patent
Whitmore et al.

(10) Patent No.: US 9,964,329 B2
(45) Date of Patent: May 8, 2018

(54) 6-WAY VALVE AND HVAC SYSTEM WITH SUCH A 6-WAY VALVE

(71) Applicant: BELIMO HOLDING AG, Hinwil (CH)

(72) Inventors: Ryan Whitmore, Brookfield, CT (US); Daryl Kaufman, Oxford, CT (US); Urs Keller, Hinwil (CH); Beat Hotz, Uster (CH)

(73) Assignee: BELIMO HOLDING AG, Hinwil (CH)

( * ) Notice: Subject to any disclaimer, the term of this patent is extended or adjusted under 35 U.S.C. 154(b) by 0 days. days.

(21) Appl. No.: 15/308,520

(22) PCT Filed: May 5, 2015

(86) PCT No.: PCT/EP2015/059823
§ 371 (c)(1),
(2) Date: Nov. 2, 2016

(87) PCT Pub. No.: WO2015/173071
PCT Pub. Date: Nov. 19, 2015

(65) Prior Publication Data
US 2017/0067665 A1    Mar. 9, 2017

(30) Foreign Application Priority Data
May 14, 2014    (CH) ........................................ 730/14

(51) Int. Cl.
*F16K 11/087*    (2006.01)
*F24F 11/02*    (2006.01)
(Continued)

(52) U.S. Cl.
CPC .......... *F24F 11/02* (2013.01); *F16K 11/0873* (2013.01); *F16K 27/003* (2013.01);
(Continued)

(58) Field of Classification Search
USPC ...................................... 251/217; 137/625.47
See application file for complete search history.

(56) References Cited

U.S. PATENT DOCUMENTS 3,674,052 A †   7/1972   Hartman
3,770,016 A *  11/1973   Johnstone ............. F16K 5/0605
                                                        137/596
(Continued)

FOREIGN PATENT DOCUMENTS

CN     201891688 U    7/2011
DE     202006002375 U1 †  5/2006
WO     2009043113 A1 †  4/2009

OTHER PUBLICATIONS

International Search Report for PCT/EP2015/059823 dated Aug. 3, 2015.
(Continued)

*Primary Examiner* — John Fox
(74) *Attorney, Agent, or Firm* — Sughrue Mion, PLLC

(57) ABSTRACT

A 6-way valve (20) comprises two similar 3-way sub-valves (20a, 20b) being mechanically coupled with each other, such that both sub-valves (20a, 20b) are always in the same position, whereby each sub-valve (20a, 20b) has three different valve ports (33, 34, 35) and a valve member (22') with an internal connecting channel (29), which valve member (22') can moved between first and second end positions via an intermediate position such that in said first end position the first (33) and third (35) valve ports are connected with each other by means of said connecting channel (29), in said second end position the second (34) and third (35) valve ports are connected with each other by means of said connecting channel (29), and in said intermediate position said connecting channel (29) is disconnected from said first and second valve ports (33, 34).
A simple and effective volume/pressure relief means (28) is provided at one of said valve members (22'), which volume/

(Continued)

pressure relief means (28) establishes a hydraulic relief connection between said first or second valve port (33, 34) and said third valve port (35) of the respective sub-valve (20a or 20b), when said sub-valves (20a, 20b) are in said intermediate position, and is inactive, when said sub-valves (20a, 20b) are in the first or second end positions.

8 Claims, 5 Drawing Sheets

(51) Int. Cl.
    *F24D 19/10* (2006.01)
    *F16K 27/06* (2006.01)
    *F16K 27/00* (2006.01)
    *F24F 5/00* (2006.01)

(52) U.S. Cl.
    CPC ........ *F16K 27/067* (2013.01); *F24D 19/1024* (2013.01); *F24F 5/0003* (2013.01); *F24D 2220/0242* (2013.01)

(56) References Cited

U.S. PATENT DOCUMENTS

| | | | | |
|---|---|---|---|---|
| 4,173,234 A | | 11/1979 | Thomas et al. | |
| 4,708,158 A | * | 11/1987 | Akamatsu | F16K 27/067 137/315.19 |
| 4,915,133 A | * | 4/1990 | Harrison | F16K 5/0605 137/625.47 |
| 6,196,268 B1 | * | 3/2001 | Steiner | F16K 5/0242 137/625.47 |
| 6,298,878 B1 | * | 10/2001 | Asano | F16K 5/0605 137/625.21 |
| 7,089,960 B2 | * | 8/2006 | Maruta | F16K 5/0605 137/625.22 |
| 7,712,724 B2 | * | 5/2010 | Thomas | F16K 5/201 137/602 |
| 8,601,634 B1 | * | 12/2013 | Stunkard | F16L 55/46 137/268 |
| 9,103,449 B2 | * | 8/2015 | Saldivar | F16K 5/0626 |
| 2010/0018399 A1 | | 1/2010 | Barone | |

OTHER PUBLICATIONS

Written Opinion for PCT/EP2015/059823 dated Aug. 3, 2015.
Jomar, Tankless Water Heater https://youtube.com/watch?v=u4asimEmLj0,1 page internet printout and 9 pages of screenshots of video, Aug. 15, 2013, internet publication with video.†
Jomar, Product Catalog, pp. 1, 59, 60 T-100P-SS-WS the Muffler Pneumatic Automatic Drain Valve, 2012, Jomar.†
Caleffi, Motorised Ball Zone Valves with 3-Contact Actuator 6442-6443-6444 Series, 8 page Technical Product Brochure, 2011, Caleffi.†

\* cited by examiner
† cited by third party

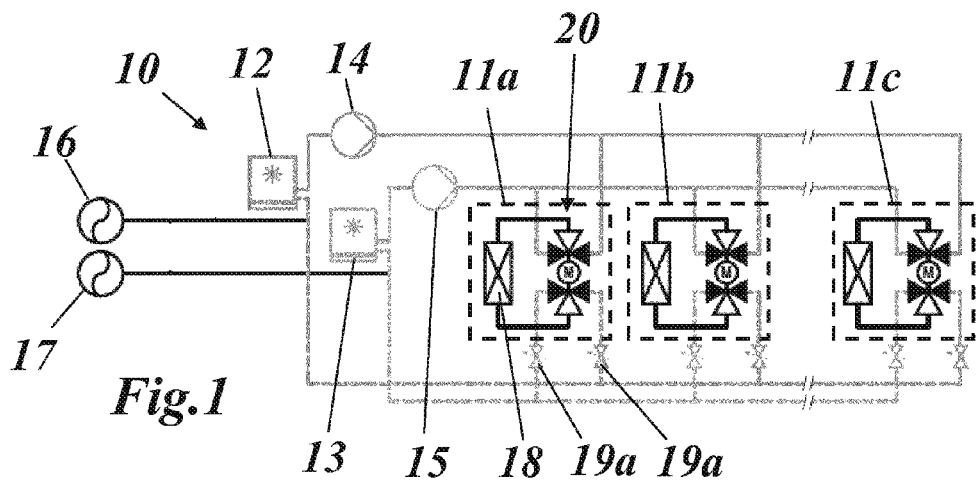
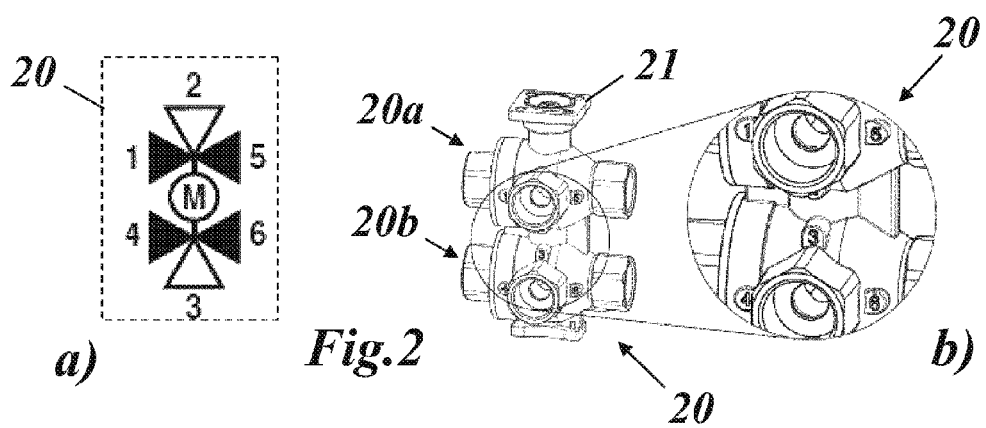
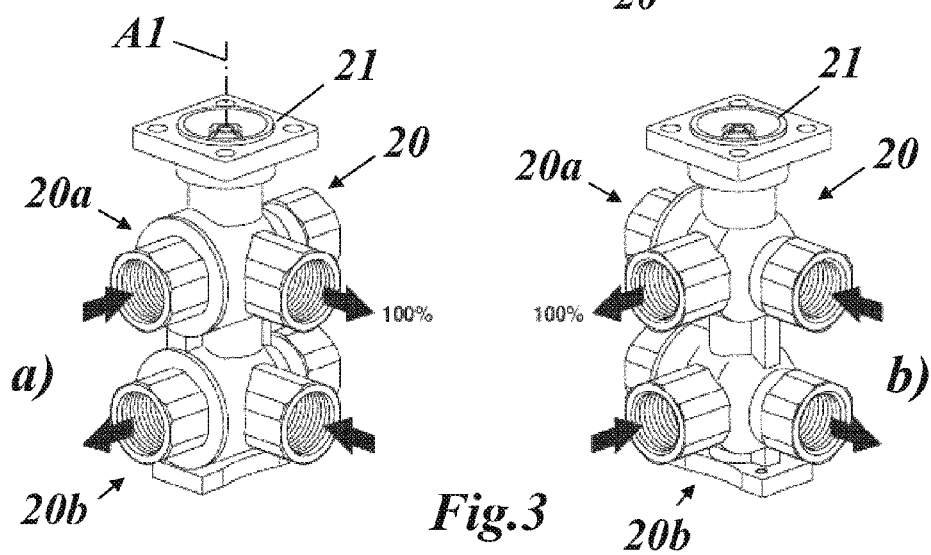
Fig.1
Fig.2
Fig.3

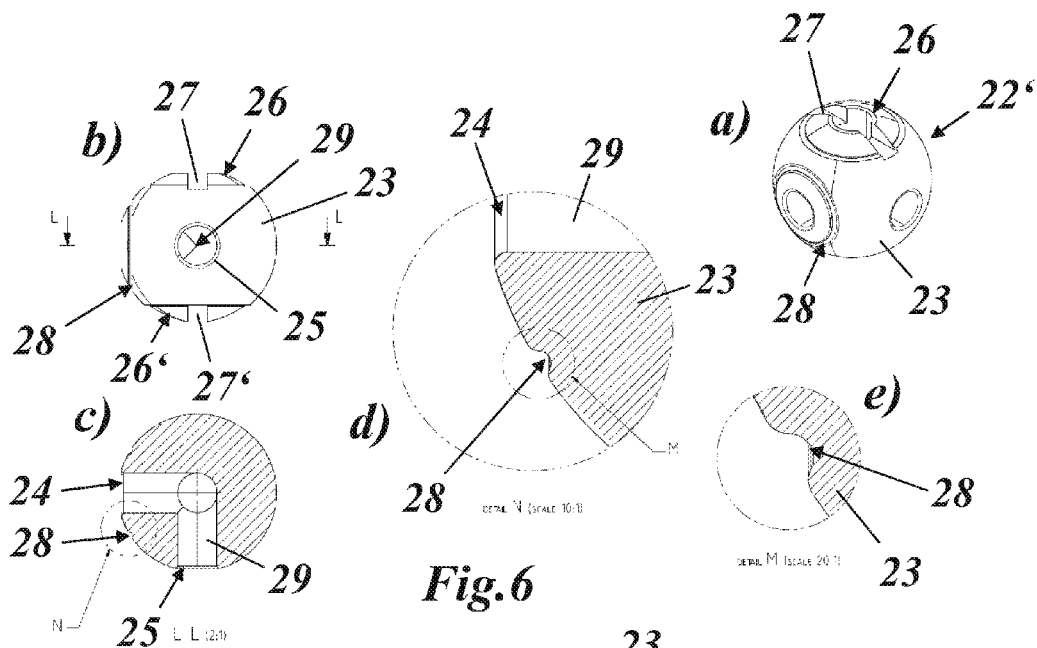
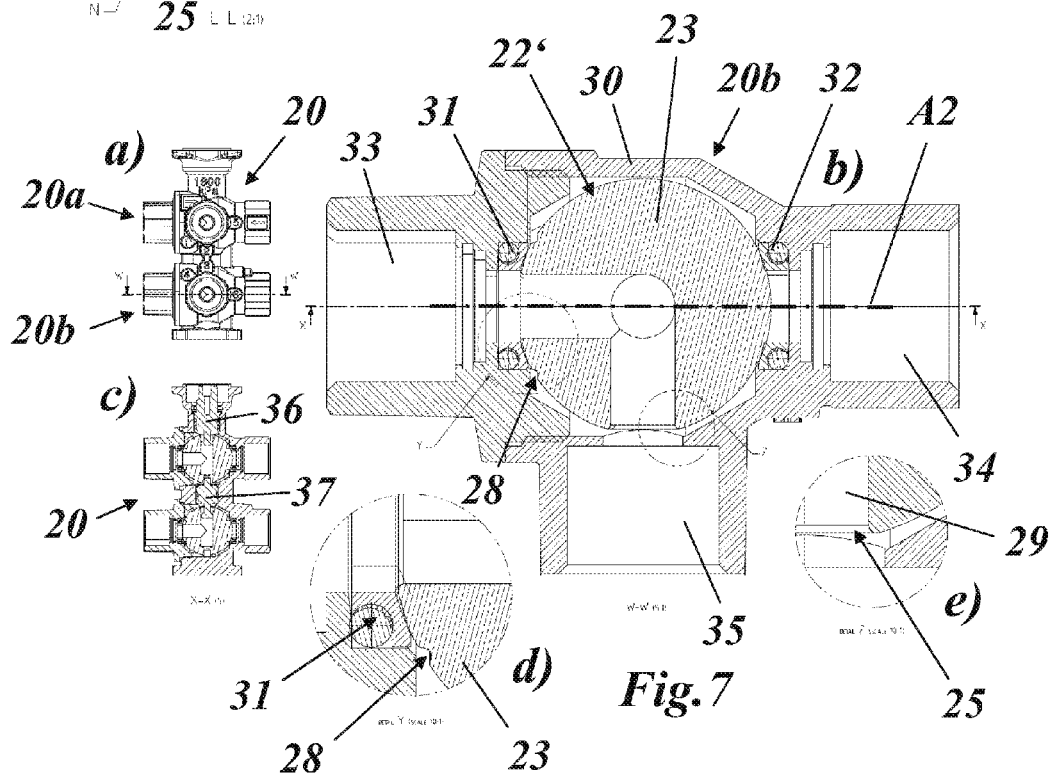

6-WAY VALVE AND HVAC SYSTEM WITH SUCH A 6-WAY VALVE

CROSS REFERENCE TO RELATED APPLICATIONS

This application is a National Stage of International Application No. PCT/EP2015/059823 filed May 5, 2015, claiming priority based on Swiss Patent Application No. 00730/14 filed May 14, 2014, the contents of all of which are incorporated herein by reference in their entirety.

BACKGROUND OF THE INVENTION

The present invention relates to the technology of HVAC systems and hydraulic valves. It refers to a 6-way-valve according to the preamble of claim 1.

It further refers to a HAVC system with such a 6-way valve.

PRIOR ART

Applicant offers on the market 6-way Characterized Control Valves (CCV), which are designed for being used in HAVC systems, specifically for chilled beams and radiant ceilings. This compact valve has the functionality of up to four straight through valves saving on space, material and installation time.

These 6-way Characterized Control Valves (CCV) feature heating and cooling circuits which are hydraulically decoupled because of a specific ball design. Each sequence is controlled individually by the rotary movement of the actuator. The valve is bubble-tight in the closed position preventing energy losses and helps reduce operating costs.

Such a 6-way CCV offers:
a) True close-off to isolate both heating and cooling loops.
b) Two sequences with different $C_v$ capabilities (e.g. heating and cooling)
c) Linear flow characteristic
d) Reduced installation cost by using only one coil for heating and cooling.
e) One valve can support the coil (load) with 2 different $C_v$ values (heating and cooling).
f) One valve performs change over and modulating control.
g) Energy savings in close position.
h) Reduced labor costs during installation.
i) Only one analog output needed to control both sequences.

FIG. 1 shows a typical application of such 6-way valves. The HVAC system 10 of FIG. 1 comprises a plurality of rooms 11a, 11b and 11c, each with a respective load (or coil) 18. The load 18 of each room 11a, 11b and 11c is connected by means of a respective 6-way valve 20 to a heating circuit 12 and a cooling circuit 13, which are each equipped with a pump 14 and 15 and connected to an expansion tank 16 and 17.

As shown by the symbol in FIG. 2(a) and the drawing in FIG. 2(b), the 6-way valve comprises two 3-way sub-valves 20a and 20b, which are mechanically coupled along a common actuating axis A1 (see FIG. 3(a)) to be synchronously actuated from one end position through an intermediate position to the other end position. For actuation a motor drive (actuator) M and combined manual actuating means can be coupled to the 6-way valve 20 at a actuator flange 21.

Each sub-valve 20a, 20b has three different valve ports, which are altogether numbered with numbers 1-6. Sub-valve 20a has valve ports 1, 2 and 5, sub-valve 20b has valve ports 3, 4 and 6. Valve ports 1 and 5 as well as 4 and 6 are opposite valve ports at respective sub-valves 20a and 20b. Valve ports 2 and 3 are the respective intermediate ports.

As can be seen in FIG. 4, a valve ball 22 in each sub-valve 20a,b connects valve ports 1 and 4 with valve ports 2 and 3 when in a first end position (FIG. 4(a), equivalent valve angle: 0°). In a second endposition, valve ports 5 and 6 are connected with valve ports 2 and 3 (FIG. 4(c), equivalent valve angle: 90°). In an intermediate position (FIG. 4(b), equivalent valve angle: 45°) the valve ports 2 and 3 are hydraulically separated from the other valve ports 1, 4 and 5, 6. On its way from first or second end position (0° or 90°) to intermediate position (45°) the hydraulic connection between respective valv ports is not interrupted immediately, but the fluid flow (characterized by parameter $k_v$) is continuously and lineraly reduced in a range of rotation of 30° FIG. 4(d).

In the HVAC system 10 of FIG. 1, in the first end position, pump 15 of the cooling circuit 13 pumps 100% cooling fluid via sub-valve 20a into the load 18, which returns to cooling circuit 13 through sub-valve 20b (FIG. 3(a)). In the second end position (FIG. 3(b)), the same is done by heating circuit 12 with pump 14.

However, there is a problem: When the 6-way valve is in the intermediate or off position, the coil (load) 18 and its entire volume, is isolated from the expansion tanks 16, 17 located on the heating and cooling circuits 12, 13.

This situation could cause high pressure in the coil (load) 18 due to volume expansion as the water temperature increases. Since water is a non-compressible fluid, the pressure will increase therebye stressing the system and its components.

SUMMARY OF THE INVENTION

It is an object of the invention, to provide a 6-way valve, which is free from the disadvantages of the 6-way valves of the prior art, especially in a simple and most effective way.

It is another object of the invention to disclose a HAVC system with such a 6-way-valve.

These and other objects are obtained by a 6-way valve according to Claim 1 and an HVAC system according to Claim 6.

The 6-way valve according to the invention comprises two similar 3-way sub-valves being mechanically coupled with each other, such that both sub-valves are always in the same position, whereby each sub-valve has three different valve ports and a valve member with an internal connecting channel, which valve member can be moved between first and second end positions via an intermediate position such that in said first end position the first and third valve ports are connected with each other by means of said connecting channel, in said second end position the second and third valve ports are connected with each other by means of said connecting channel, and in said intermediate position said connecting channel is disconnected from said first and second valve ports.

It is characterized in that a volume/pressure relief means is provided at one of said valve members, which volume/pressure relief means establishes a hydraulic relief connection between said first or second valve port and said third valve port of the respective sub-valve, when said sub-valves are in said intermediate position, and is inactive, when said sub-valves are in the first or second end positions.

The 6-way valve according to the invention can have different basic configurations.

One possibility is that said sub-valves are configured as linear valves being moved in a linear way. Such a 6-way valve may have a cylindrical geometry.

In another embodiment that we be explained in more detail below, said sub-valves are arranged along a common actuating axis, that the valve members can be rotated around said common actuating axis between said first and second end positions via said intermediate position.

Specifically, said valve members are axially symmetric with respect to said common actuating axis, and that said volume/pressure relief means comprises a groove on the surface of one of said valve members.

More specifically, said valve members are spherical balls, that said groove is a ball groove, that said internal connecting channels each extend through a respective of said balls between two ball ports in a plane perpendicular to said common actuating axis, that said valve members are each supported by sealed ball seats at said first and second valve ports, and that said ball groove on the surface of one of said balls is in the form of a concentric circular ring around one of said ball ports.

Even more specifically, the radius of said ball groove is chosen such that said ball groove crosses twice the sealed ball seat of said first or second valve port, thereby establishing said hydraulic relief connection, when said sub-valves are in said intermediate position.

According to another embodiment of the invention said sub-valves are moved between said first and second end positions by a rotation of 90° around said common actuating axis, and that said intermediate position is reached with a rotation of ±45° around said common actuating axis from said first end second end positions.

The HVAC system according to the invention comprises at least one load, which is connected to a heating circuit and a cooling circuit by means of a 6-way valve. It is characterized in that said 6-way valve is a valve according to the invention.

An embodiment of the HVAC system according to the invention is characterized in that said heating circuit and/or said cooling circuit are connected to an expansion tank, that the load is connected to the third valve ports of both said sub-valves, and that said heating and cooling circuits are connected to said first valve ports and second valve ports of both sub-valves, respectively, such that said load is connected with an expansion tank via said volume/pressure relief means, when said sub-valves are in said intermediate position.

BRIEF DESCRIPTION OF THE DRAWINGS

The present invention is now to be explained more closely by means of different embodiments and with reference to the attached drawings.

FIG. 1 shows a scheme of an HVAC system with various loads, which are connected to a heating and cooling circuit by means of 6-way valves;

FIG. 2 shows in FIG. 2(a) the numeration of the various valve ports of an exemplary 6-way valve, while FIG. 2(b) is a perspective view of an actual 6-way valve with its two sub-valves and six valve ports;

FIG. 3 shows the fluid flow in the two end positions (a) and (b) of a 6-way valve in accordance with FIG. 2(b);

FIG. 4 shows the configuration of a sub-valve in first and second end positions (a) and (c), and in an intermediate (closed) position (b), while FIG. 4(d) shows the fluid flow of the valve in dependence of the valve angle alpha ($\alpha$);

FIG. 6 shows various views (a) to (e) of the valve ball according to FIG. 5; and FIG. 7-10 shows in various views positions of a 6-way valve according to an embodiment of the invention at four different valve angels 0° (FIG. 7), 45° (FIG. 8), 52°/FIG. 9, and 60° (FIG. 10).

DETAILED DESCRIPTION OF DIFFERENT EMBODIMENTS OF THE INVENTION

To allow the relief of pressure due to volume expansion in the closed, intermediate position of the 6-way valve, the provision of a volume/pressure relief means, especially in form of a groove on the surface of one of the valve members, preferably in form of a ball groove, is proposed.

Figure 5:
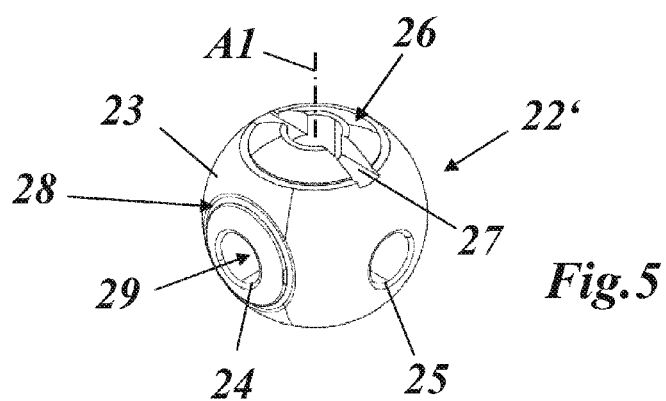
FIG. 5 shows in a perspective view a valve ball of a sub-valve with a circular concentric ball groove as a volume/pressure relief means according to an embodiment of the invention.
Figure 8:
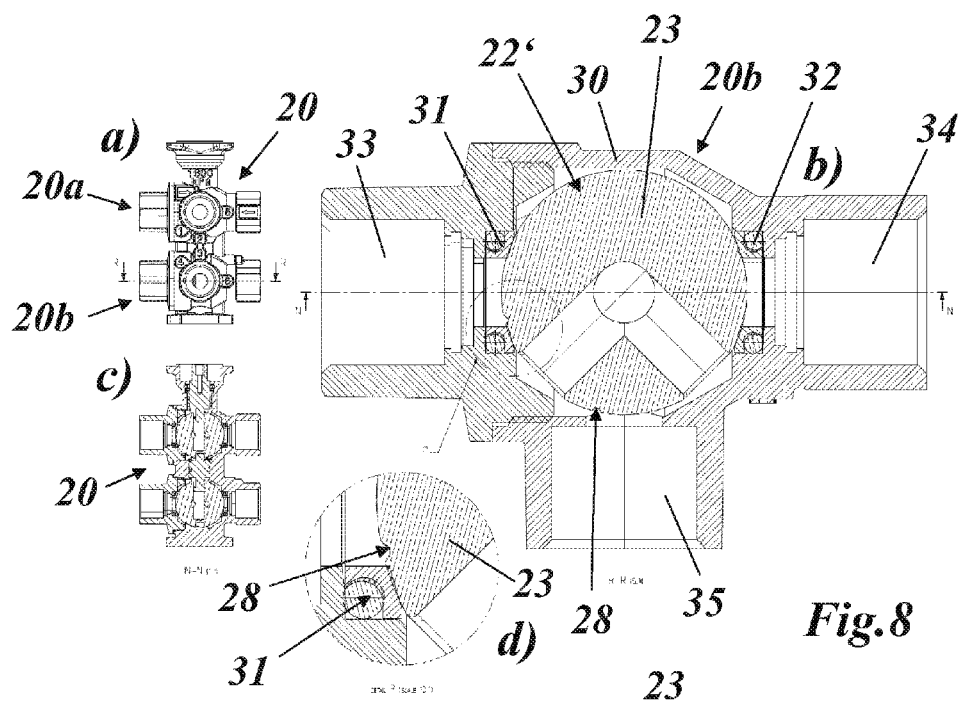

An embodiment of such a valve ball with a circular ball groove on its surface is shown in a perspective view in FIG. 5. The spherical ball 22' of FIG. 5 comprises an connecting channel 29, which extends through the interior of the ball body 23 with a 90° turning between first and second ball ports 24 and 25 and in a plane perpendicular to the common actuating axis A1. A concentric ball groove 28 is provided at the first ball port 24. The ball 22' is further equipped with coupling parts 26, 26' at both poles, which comprise a coupling grove 27, 27' (FIG. 6(b)). Within the valve 20, coupling elements 36, 37 (FIG. 7(c)) are provided for mechanical coupling of the two balls. Ball 22' of FIG. 5 is shown in various views in FIG. 6.

Figure 9:
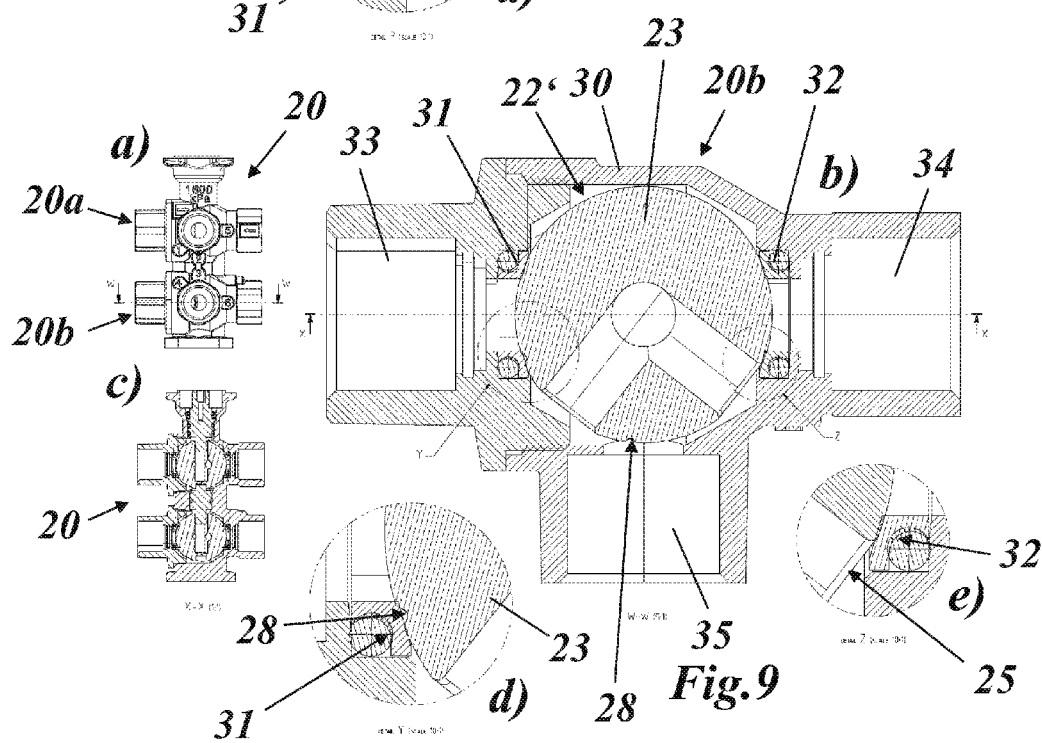
Figure 10:
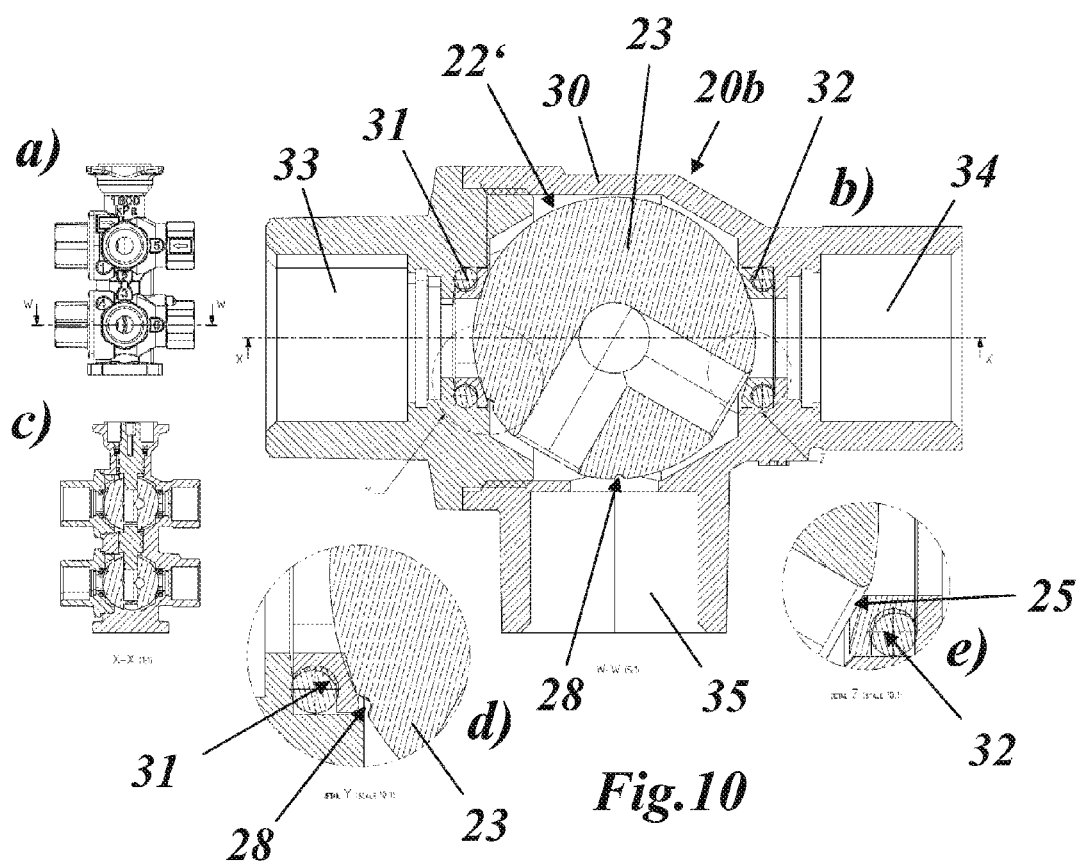

The volume/pressure-relieving effect of ball groove 28 can best be seen when looking at FIGS. 7-10, where the position of the grooved ball 22' in the 6-way valve is shown for different valve angles of 0° (FIG. 7), 45° (FIG. 8), 52° (FIG. 9) and 60° (FIG. 10). Ball 22' is supported in a common valve housing 30 by two opposing sealed ball seats 31 and 32, which are provided at first and second valve ports 33 and 34, coaxial with axis A2 (see for example FIG. 7). When 6-way valve 20 is in the first end position, as shown in FIG. 7, ball groove 28 lies outside the sealed connection between valve port 33 and connecting channel 29. Consequently, ball groove 28 has no effect on the connection.

When 6-way valve 20 is now rotated about 45° into its closed, intermediate position (FIG. 8), ball groove 28 crosses twice ball seat 31 and thus establishes a volume/pressure relief connection of small cross section between valve ports 33 and 35, so that in a system according to FIG. 1 an overpressure in load 18 can be relieved into one of the expansion tanks 16 and 17.

A further rotation of 7° to a valve angle of 52° (FIG. 9) ends the crossing of ball groove 28 and ball seat 31, so that the relief means is no longer active, when the rotation progresses to 60° (FIG. 10), and more.

In this way, while in the closed position, the ball groove 28 allows volume/pressure to instantaneously escape from the coil or load 18 to the heating or cooling circuit expansion tank 16 or 17.

The relief of pressure through the ball groove 28 is not to be considered "leakage" for the 6-way valve 20. Due to the fact that the 6-way valve 20 has four sealing seats, two seats 31 and 32 on each circuit, if one seat became damaged, the second seat would still seal the circuit preventing unwanted "leakage" to the coil.

Thus, a small groove, easily machined into the sphere of a ball 22' of the 6-way valve 20 allows the relief of volume/pressure while the valve is in the off position, isolated from the volume expansion tanks in the heating and cooling circuits.

The groove 28 is cut into the ball sphere 22' offset from the primary flow path hole (ball port 24) allowing the remaining sphere surface to provide support of the seats 31, 32 during modulation and while in the fully open flow position.

The groove 28 is designed so that mixing of water from the heating and cooling circuits could never occur by providing a small dead zone when switching between the circuits (when progressing from 52° to 60° in FIGS. 9 and 10). This is achieved by choosing the correct geometry of the groove 28 and position on the ball sphere 22'.

The width and depth of the groove 28 is important to ensure that the groove 28 cannot be plugged by debris, and that, when a certain 6-volt signal is provided to the actuator M of the valve, the groove pressure relief is activated. The hysteresis in the actuator M and valve 20 is accounted for in determining the groove width and position on the sphere.

The ball groove design could be applied to the top or bottom ball of sub-valve 20a or 20b, but not both. The ball without the groove is always used as "master" and the ball with the groove is "slave". This concept also prevents the mixing of water from the heating and cooling circuits 13 and 14. However, it is preferred to apply the groove 28 to the top ball (sub-vale 20a) in order to provide better performance by reducing the valve hysteresis.

The ball groove 28 allows the volume/pressure to escape from two contact points, 180° apart at the point where the groove 28 contacts the sealing surface of the seat 31. Having two contact points reduces the risk of plugging to ensure the groove 28 will operate when needed.

Figure 4:
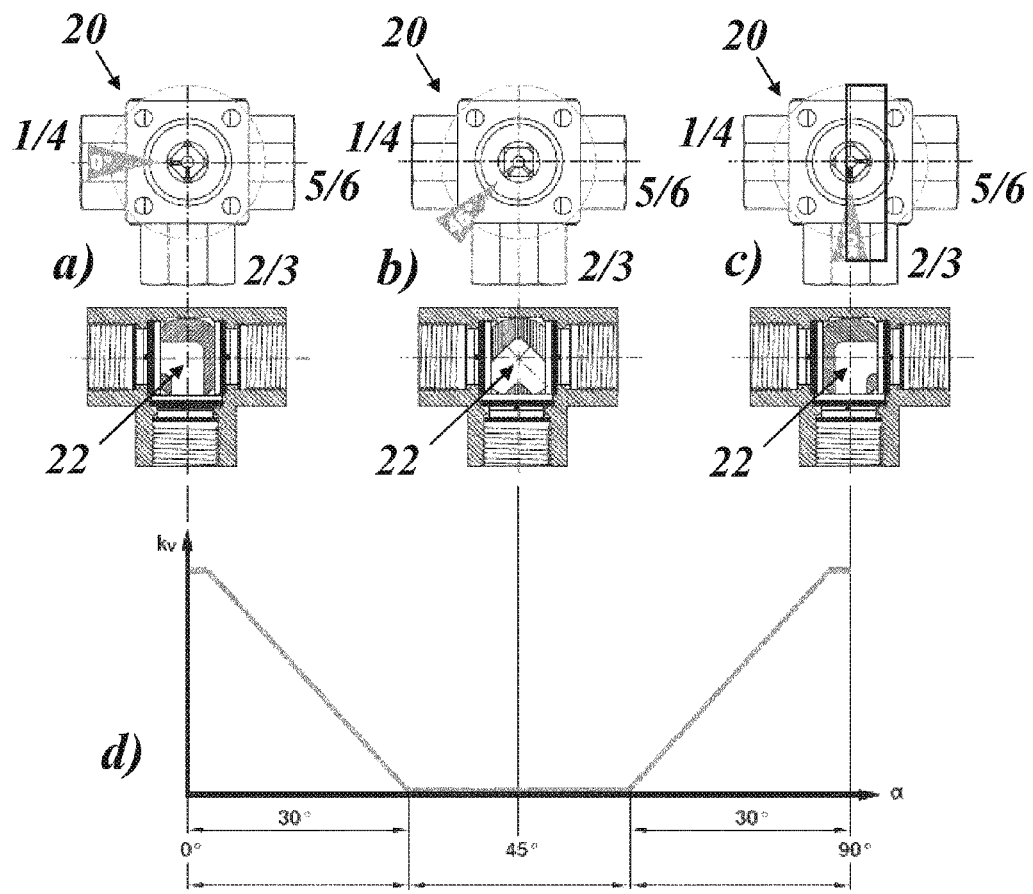

The proposed 6-way valve 20 is a unique valve due to the fact that has three positions; heating, off and cooling. Each position has an operating zone of 30 degrees where off is located in the middle to prevent the hot and cold water from mixing as the sequence is transitioning from heating to cooling or vice versa. (see FIG. 4; the three positions are indicated by 0°, 45° and 90°, whereby 45° is off).

The 6-way valve 20 with its volume/pressure relief means according to the invention may especially be a DN15 or DN20 valve.

Although the 6-way valve according to the invention has been explained by an example of a rotary valve, it is clear that the invention is not limited to rotary valves but can be applied to linear valves as well.

LIST OF REFERENCE NUMERALS 1-6 valve port (6-way valve)
10 HVAC system
11a-c room
12 heating circuit
13 cooling circuit
14,15 pump
16,17 expansion tank
18 load (coil)
19a,b control valve
20 6-way valve
20a,b sub-valve
21 actuator flange
22,22' ball (spherical)
23 body (spherical)
24,25 ball port
26,26' coupling part
27,27' coupling groove
28 ball groove (circular)
29 connecting channel
30 housing
31,32 ball seat
33,34,35 valve port (sub-valve)
36,37 coupling element
A1,A2 axis

What is claimed is:

1. A 6-way valve (20) comprising two similar 3-way sub-valves (20a, 20b) mechanically coupled with each other, such that both sub-valves (20a, 20b) are always in the same position, whereby each sub-valve (20a, 20b) has three different valve ports (33, 34, 35) and a valve member (22, 22') with an internal connecting channel (29), which valve member (22, 22') can be moved between first and second end positions via an intermediate position such that in said first end position the first (33) and third (35) valve ports are connected with each other by means of said connecting channel (29), in said second end position the second (34) and third (35) valve ports are connected with each other by means of said connecting channel (29), and in said intermediate position said connecting channel (29) is disconnected from said first and second valve ports (33, 34), characterized in that a volume/pressure relief means (28) is provided at one of said valve members (22, 22'), which volume/pressure relief means (28) establishes a hydraulic relief connection between said first or second valve port (33, 34) and said third valve port (35) of the respective sub-valve (20a or 20b), when said sub-valves (20a, 20b) are in said intermediate position, and is inactive, when said sub-valves (20a, 20b) are in the first or second end positions.

2. The 6-way valve as claimed in claim 1, characterized in that said sub-valves (20a, 20b) are arranged along a common actuating axis (A1), that the valve members (22, 22') can be rotated around said common actuating axis (A1) between said first and second end positions via said intermediate position.

3. The 6-way valve as claimed in claim 2, characterized in that said valve members (22, 22') are axially symmetric with respect to said common actuating axis (A1), and that said volume/pressure relief means comprises a groove (28) on the surface of one of said valve members (22, 22').

4. The 6-way valve as claimed in claim 3, characterized in that said valve members (22, 22') are spherical balls, that said groove is a ball groove (28), that said internal connecting channels (29) each extend through a respective of said balls (22, 22') between two ball ports (24, 25) in a plane perpendicular to said common actuating axis (A1), that said valve members (22, 22') are each supported by sealed ball seats (31, 32) at said first and second valve ports (33, 34), and that said ball groove (28) on the surface of one of said balls (22, 22') is in the form of a concentric circular ring around one of said ball ports (24, 25).

5. The 6-way valve as claimed in claim 4, characterized in that the radius of said ball groove (28) is chosen such that said ball groove (28) crosses twice the sealed ball seat (31, 32) of said first or second valve port (33, 34), thereby establishing said hydraulic relief connection, when said sub-valves (20a, 20b) are in said intermediate position.

6. The 6-way valve as claimed in claim 4, characterized in that said sub-valves (20a, 20b) are moved between said first and second end positions by a rotation of 90° around said common actuating axis (A1), and that said intermediate position is reached with a rotation of ±45° around said common actuating axis (A1) from said first end second end positions.

7. A HVAC system comprising at least one load (18), which is connected to a heating circuit (12) and a cooling circuit (13) by means of a 6-way valve (20), characterized in that said 6-way valve (20) is a valve according to claim 1.

8. The HVAC system as claimed in claim 7, characterized in that said heating circuit (12) and/or said cooling circuit (13) are connected to an expansion tank (16, 17), that the load (18) is connected to the third valve ports (35) of both said sub-valves (20a, 20b), and that said heating and cooling circuits (12, 13) are connected to said first valve ports (33) and second valve ports (34) of both sub-valves (20a, 20b), respectively, such that said load (18) is connected with an expansion tank (16 or 17) via said volume/pressure relief means (28), when said sub-valves (20a, 20b) are in said intermediate position.

* * * * *